(12) United States Patent
Sasaki et al.

(10) Patent No.: US 6,690,872 B2
(45) Date of Patent: Feb. 10, 2004

(54) SILICA BASED OPTICAL WAVEGUIDE AND PRODUCTION METHOD THEREFOR

(75) Inventors: Takashi Sasaki, Kanagawa (JP); Shigeru Hirai, Kanagawa (JP); Nobuhiro Akasaka, Kanagawa (JP); Shigeru Tanaka, Kanagawa (JP); Chisai Hirose, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 12 days.

(21) Appl. No.: 09/756,869

(22) Filed: Jan. 10, 2001

(65) Prior Publication Data

US 2001/0007606 A1 Jul. 12, 2001

(30) Foreign Application Priority Data

Jan. 12, 2000  (JP) ..................................... P.2000-003515
May 26, 2000  (JP) ..................................... P.2000-156269

(51) Int. Cl.[7] ............................................ G02F 1/1337
(52) U.S. Cl. ....................... 385/132; 385/129; 385/131; 385/14; 385/130
(58) Field of Search ................................. 385/132, 131, 385/129, 14

(56) References Cited

U.S. PATENT DOCUMENTS 4,896,942 A * 1/1990 Onstott et al. .............. 385/127
5,949,945 A * 9/1999 Okano et al. ............... 385/129
6,189,342 B1 * 2/2001 Berkey ......................... 65/412

FOREIGN PATENT DOCUMENTS

JP        6-27342       2/1994
JP        7-318734      12/1995

* cited by examiner

*Primary Examiner*—Toan Ton
*Assistant Examiner*—George Wang
(74) *Attorney, Agent, or Firm*—McDermott, Will & Emery

(57) ABSTRACT

A silica based optical waveguide is described, comprising a substrate, a core waveguide formed thereon, and an over cladding part comprising a silica based glass with a refractive index lowering dopant and a refractive index increasing dopant added, formed on the substrate so as to cover the core waveguide, wherein a segregation layer with a higher concentration of the refractive index increasing dopant is formed in a part of the over cladding part in contact with the substrate and the core waveguide such that at least a part of the refractive index increase in the segregation layer provided by the refractive index increasing dopant with respect to the part of the over cladding part other than the segregation layer is offset by decline of the refractive index by increasing the amount of the refractive index lowering dopant added in the segregation layer and/or adding another refractive index lowering dopant.

8 Claims, 4 Drawing Sheets

$P_2O_5$ concentration
in the $P_2O_5$ segregation layer (% by weight)

$P_2O_5$ segregation layer thickness (μm)

US 6,690,872 B2

SILICA BASED OPTICAL WAVEGUIDE AND PRODUCTION METHOD THEREFOR

FIELD OF THE INVENTION

The present invention relates to a silica based optical waveguide provided with a core waveguide and an over cladding part on a substrate, to be used for the optical communication field, and a production method therefor.

BACKGROUND OF THE INVENTION

A silica based optical waveguide comprising a core waveguide made of a silica based glass with a rectangular or square lateral cross-section with a refractive index increasing dopant such as $GeO_2$ added, having a relatively high refractive index formed on a substrate made of a silica, silicon, or the like, and an over cladding part made of a silica based glass, having a refractive index lower than that of the core waveguide formed on the substrate so as to cover the core waveguide, is well known. Moreover, the over cladding part of the silica based optical waveguide is produced by, in general, accumulating silica based glass fine particles on the substrate provided with the core waveguide by Flame Hydrolysis Deposition (FHD) method so as to form a porous silica based glass layer, and sintering the same so as to be transparent.

Moreover, in order to prevent deformation of the core waveguide by the heat at the time of sintering the porous silica based glass layer, a dopant such as $P_2O_5$, and $B_2O_3$ is added to $SiO_2$ in the over cladding part for lowering the softening temperature such that the softening temperature of the over cladding part is made lower than the softening temperature of the core waveguide. The refractive index of the over cladding part should be lower than the refractive index of the core waveguide so as to be substantially same as the refractive index of the substrate so that the refractive index increasing effect of $P_2O_5$ and the refractive index lowering effect of $B_2O_3$ offset with each other.

According to the silica based optical waveguide, due to the difference in the thermal expansion coefficients in the substrate and the over cladding part surrounding the core waveguide, anisotropic thermal distortion is generated in the core waveguide so that the polarization dependency is generated. According to an optical wavelength multiplexer and demultiplexer comprising the silica optical waveguide, since the multiplexing and demultiplexing characteristics are changed according to its polarization dependency, a silica based optical waveguide with least polarization dependency is called for. JP-A-6-27342 and JP-A-7-318734 disclose a method for reducing the polarization dependency of a silica based optical waveguide. (The term "JP-A" as used herein means an "unexamined published Japanese patent application".)

The method disclosed in JP-A-6-27342 is for reducing the polarization dependency by having the total doping amount of $P_2O_5$ and $B_2O_3$ in the over cladding part by 1 to 3%. Moreover, the method disclosed in JP-A-7-318734 is for reducing the polarization dependency by forming a thin film glass layer having a refractive index smaller than that of a core waveguide and same as or more than that of a substrate, on the border surface between the over cladding part and the substrate or the core waveguide.

However, if the total doping amount of $P_2O_5$ and $B_2O_3$ in the over cladding part is reduced as disclosed in JP-A-6-27342, crystals may be generated on the interface between the core waveguide and the over cladding part. Since the crystal generation brings about a great adverse effect to the propagating loss as the optical waveguide, it should be avoided. Moreover, according to the method disclosed in JP-A-7-318734, the refractive index of the thin film glass layer is larger than that of the over cladding part. Therefore, if the thickness of the thin film glass layer is large, a plurality of the core waveguides cannot be disposed parallel with a narrow interval in the optical waveguide, and thus it is difficult to reduce the total size of the optical waveguide. Moreover, if the $P_2O_5$ concentration is lowered so as to lower the refractive index of the thin film glass layer, crystals may be generated on the interface with respect to the core waveguide.

SUMMARY OF THE INVENTION

Accordingly, in order to solve the problems of the prior art, the invention is to provide an optical waveguide with little polarization dependency, capable of achieving a high density arrangement of a core waveguide by eliminating crystals generated on the interface between the core waveguide and the over cladding part and preventing formation of a thin film layer having a refractive index larger than that of the other part in the over cladding part, on the interface between the core waveguide and the over cladding part, and a production method therefor.

A silica based optical waveguide according to the invention comprises a substrate, a core waveguide formed thereon, and an over cladding part comprising a silica based glass with a refractive index lowering dopant and a refractive index increasing dopant added, formed on the substrate so as to cover the core waveguide, wherein a segregation layer with a higher concentration of the refractive index increasing dopant is formed in a part of the over cladding part in contact with the substrate and the core waveguide such that at least a part of the refractive index increase in the segregation layer provided by the refractive index increasing dopant with respect to the part of the over cladding part other than the segregation layer is offset by decline of the refractive index by increasing the amount of the refractive index lowering dopant added in the segregation layer and/or adding another refractive index lowering dopant.

Accordingly, since the segregation layer with a higher concentration of the refractive index increasing dopant is formed in the part of the over cladding part in contact with the substrate and the core waveguide, crystal generation can be restrained. Moreover, since at least a part of the increase of the refractive index in the segregation layer is offset by decline of the refractive index by increasing the amount of the refractive index lowering dopant added and/or adding another refractive index lowering dopant, the refractive index of the part of the over cladding part in contact with the core waveguide can be substantially same as the other part of the over cladding part, and thus transmitting light beams can hardly interfere with each other even in the case of a high density arrangement of a plurality of core waveguides parallel with a narrow interval.

In the present invention, the refractive index increasing dopant is preferably $P_2O_5$, the refractive index lowering dopant is preferably $B_2O_3$, and the other refractive index lowering dopant is preferably fluorine.

Furthermore, an optical waveguide according to the invention can be produced as follows. First, after forming a core glass film on a substrate, a core waveguide with a rectangular or square lateral cross-section is formed from the core glass film by a photolithography, a reactive ion etching, or the like. By accumulating glass fine particles comprising a silica glass with a refractive index lowering dopant and $P_2O_5$ added by FHD method on the substrate so as to cover the core waveguide while keeping the substrate with the core waveguide formed at a 500° C. to 700° C. temperature, a porous silica based glass layer having a segregation layer with $P_2O_5$ segregated with a higher concentration in the part in contact with the substrate and the core waveguide is formed.

Next, the porous silica based glass layer is heated in a fluorine gas atmosphere so as to offset the refractive index increase in the segregation layer derived from the segregation of $P_2O_5$ by the refractive index decline by segregation of fluorine, and subsequently the porous silica based glass layer is sintered so as to provide a transparent vitrified over cladding part. Moreover, instead of offset the increase of the refractive index derived from the segregation of $P_2O_5$ by the refractive index decline by fluorine, it is also possible to offset the increase of the refractive index derived from the segregation of $P_2O_5$ by increase of the refractive index lowering dopant amount by adjusting the material supply amount of the refractive index lowering dopant in the part so as to increase the dopant amount. Moreover, it is also possible to offset the entire refractive index increase derived from the segregation of $P_2O_5$ by employing both offset by fluorine and offset by the refractive index lowering dopant amount increase.

Figure 1:
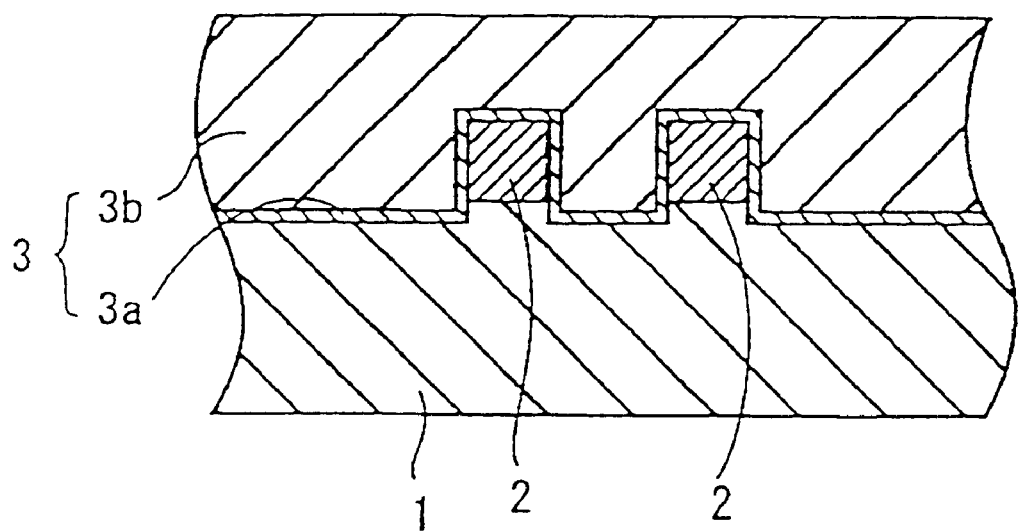
FIG. 1 is a lateral cross-sectional view of an embodiment of a silica based optical waveguide according to the present invention.

Description of the Reference Numerals and Signs 1 substrate
2 core waveguide
3 over cladding part
3a segregation layer
3b part of the over cladding part other than the segregation layer.

DETAILED DESCRIPTION OF THE INVENTION

FIG. 1 is a lateral cross-sectional view of an embodiment of a silica based optical waveguide according to the present invention. The numeral 1 denotes a substrate, 2 a core waveguide, 3 an over cladding part, 3a a segregation layer, and 3b a part of the over cladding part other than the segregation layer. The substrate 1 is a flat plate comprising a silica glass or silicon, or a such flat plate with an $SiO_2$ glass film formed on the surface thereof. The core waveguide 2 is provided by comprising the steps of forming a core glass film comprising a silica glass containing a dopant for increasing the refractive index, such as $GeO_2$ on the substrate 1 by a plasma Chemical Vapor Deposition (CVD) method, FHD method, or the like, and forming a circuit with a rectangular or square lateral cross-section, elongating in the longitudinal direction from the core glass film by a photolithography, a reactive ion etching, or the like.

Moreover, the over cladding part 3 is a glass layer comprising a silica glass as the main composition, formed on the substrate 1 so as to cover the core waveguide 2, with a refractive index lower than that of the core waveguide 2 and substantially same as that of the substrate 1. The over cladding part 3 is a glass layer that is provided by comprising the steps of forming a porous silica based glass layer by accumulating glass fine particles comprising a silica glass containing a refractive index lowering dopant such as $B_2O_3$ and a refractive index increasing dopant such as $P_2O_5$ on the substrate 1 by FHD method so as to cover the core waveguide 2, and sintering the porous silica based glass layer for transmitting the light in the core. Furthermore, the porous silica based glass layer can also be formed by a CVD method, or a plasma CVD method.

In the porous silica based glass layer formation, by accumulating the glass fine particles with the substrate 1 provided with the core waveguide 2 heated at 500° C. to 700° C., a porous silica based glass layer having a segregation layer with a concentration of the refractive index increasing dopant $P_2O_5$ higher than the other part in the part in contact with the substrate and the core waveguide can be formed. At the time, although the segregation layer of the refractive index increasing dopant $P_2O_5$ with a locally higher concentration is formed, the refractive index lowering dopant $B_2O_3$ is provided with a uniform concentration without segregation.

Moreover, the $P_2O_5$ concentration in the $P_2O_5$ segregation layer and the thickness of the segregation layer can be adjusted according to the material gas supply amount and the substrate heating temperature. Furthermore, since the substrate can be heated homogeneously by forming the entirety or the principal part of the turn table to be used for the porous silica based glass layer formation on the substrate 1 with silicon, supporting the substrate 1 by a holder comprising silicon, and placing the same on a part of the rotating turn table comprising silicon for heating by a heater disposed below the turn table because of good heat conduction of silicon, the concentration and the thickness of the $P_2O_5$ segregation layer can be uniform.

Next, the substrate with the porous silica based glass layer formed is heated in a fluorine gas atmosphere containing an $SiF_4$, and a helium gas. Thereby, fluorine is taken into the porous silica based glass layer. In this state, with the $SiF_4$ supply stopped, the heating operation is continued only with the helium gas for transparent vitrification of the porous silica based glass layer so as to provide the over cladding part 3. Thereby, fluorine once entered in the vicinity of the over cladding part surface goes out from the over cladding part during the heating operation in the helium gas atmosphere, the fluorine concentration in the $P_2O_5$ segregation layer part away from the over cladding part surface can be made higher and the fluorine concentration in the other part lower so as to segregate fluorine.

Accordingly, the segregation layer 3a of about a 1.5 μm to about 5 μm thickness with a higher $P_2O_5$ concentration is formed in the part of the over cladding part 3 in contact with the substrate 1 and the core waveguide 2. Moreover, since the fluorine concentration and the thickness of the fluorine-segregated part can be adjusted by the $SiF_4$ concentration in the fluorine gas atmosphere, and the heating temperature and heating time under or without the existence of the $SiF_4$, the thickness thereof is matched with the $P_2O_5$ segregation layer thickness. Furthermore, the $P_2O_5$ concentration in the $P_2O_5$ segregation layer is adjusted to be 1% by weight to 15% by weight with the fluorine concentration to a degree sufficient for offsetting the refractive index increase by the $P_2O_5$ by the refractive index decline by $B_2O_3$ and fluorine.

Figure 2A:
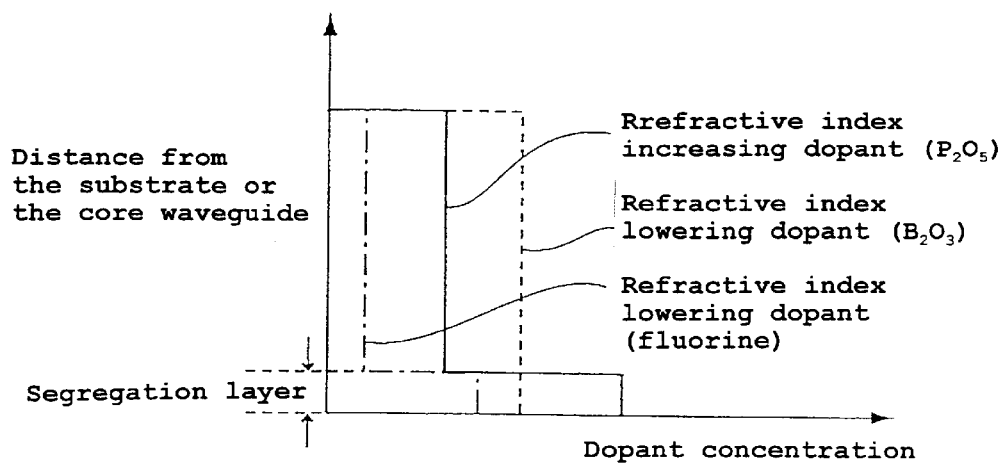
FIGS. 2A and 2B are graphs for explaining the dopant concentration distribution and the refractive index change by the dopant in the over cladding part in the case the refractive index increase in the $P_2O_5$ segregation layer is offset by the fluorine addition.
Figure 2B:
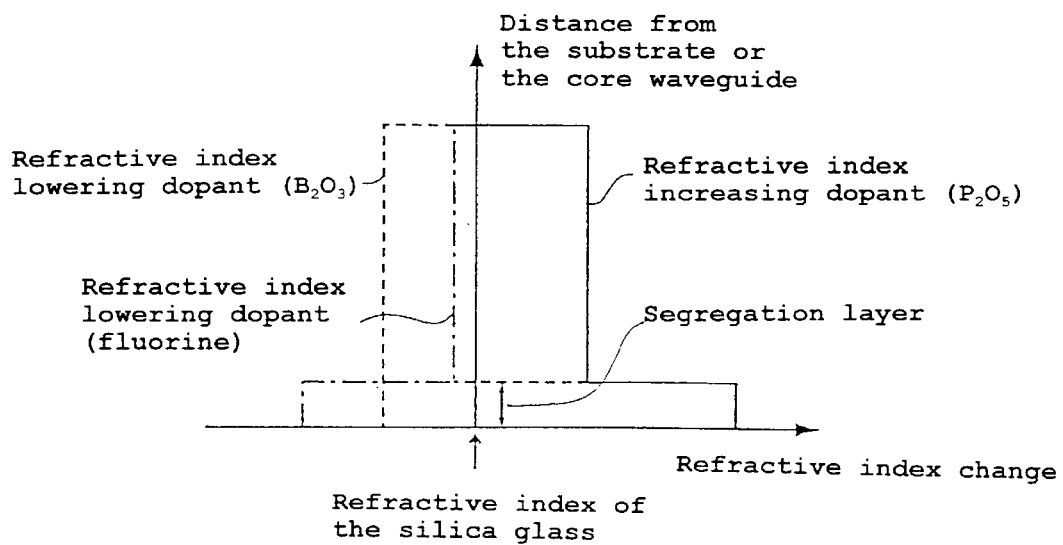

FIGS. 2A, 2B are graphs for explaining the dopant concentration distribution and the refractive index change by the dopant in the over cladding part. The vertical axis represents the distance from the substrate or the core waveguide in the over cladding part, and the lateral axis represents the dopant concentration in FIG. 2A, and the refractive index change in FIG. 2B. The segregation layer is formed in the part of the over cladding part close to the substrate or the core waveguide, with a relatively high $P_2O_5$ and fluorine concentration in the segregation layer with respect to the other part. The $B_2O_3$ concentration is same as the other part.

Moreover, the refractive index is changed drastically to the +side in the segregation layer, and it is changed slightly to the +side in the other part by $P_2O_5$. The refractive index is changed drastically to the −side in the segregation layer, and it is changed slightly to the −side in the other part by fluorine. Furthermore, the refractive index is changed uniformly to the −side by $B_2O_3$. The concentration of each dopant is adjusted such that the total refractive index change brought about by $P_2O_5$, fluorine, and $B_2O_3$ can be substantially zero in the segregation layer part and the other part.

Although a method for offsetting the relative refractive index increase of the segregation layer in the over cladding part with a higher $P_2O_5$ concentration with respect to the other part by the fluorine segregation, and the refractive index increase of the entire over cladding part by $P_2O_5$ by adding $B_2O_3$ and fluorine has been described, it is also possible to offset the refractive index of the segregation layer only by $B_2O_3$ without using fluorine.

In the case of offsetting by $B_2O_3$, in forming the porous silica based glass layer by FHD method, the $B_2O_3$ amount is changed by supplying the material gas for producing $B_2O_3$ initially by a large amount and halfway by a reduced amount so that the $B_2O_3$ amount added in the $P_2O_5$ segregation layer is increased with respect to the $B_2O_3$ amount in the other part.

Accordingly, the refractive index increase derived from a high $P_2O_5$ concentration in the $P_2O_5$ segregation layer can be offset by the refractive index decline by the refractive index decline derived from the increase of the $B_2O_3$ amount.

Figure 3A:
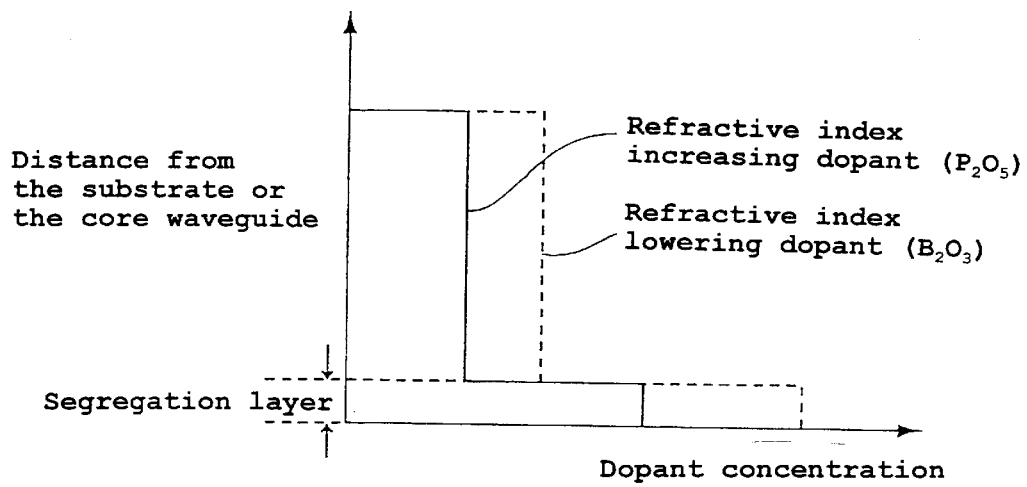
FIGS. 3A and 3B are graphs for explaining the dopant concentration distribution and the refractive index change by the dopant in the over cladding part in the case the refractive index increase in the $P_2O_5$ segregation layer is offset by the $B_2O_3$ amount increase.
Figure 3B:
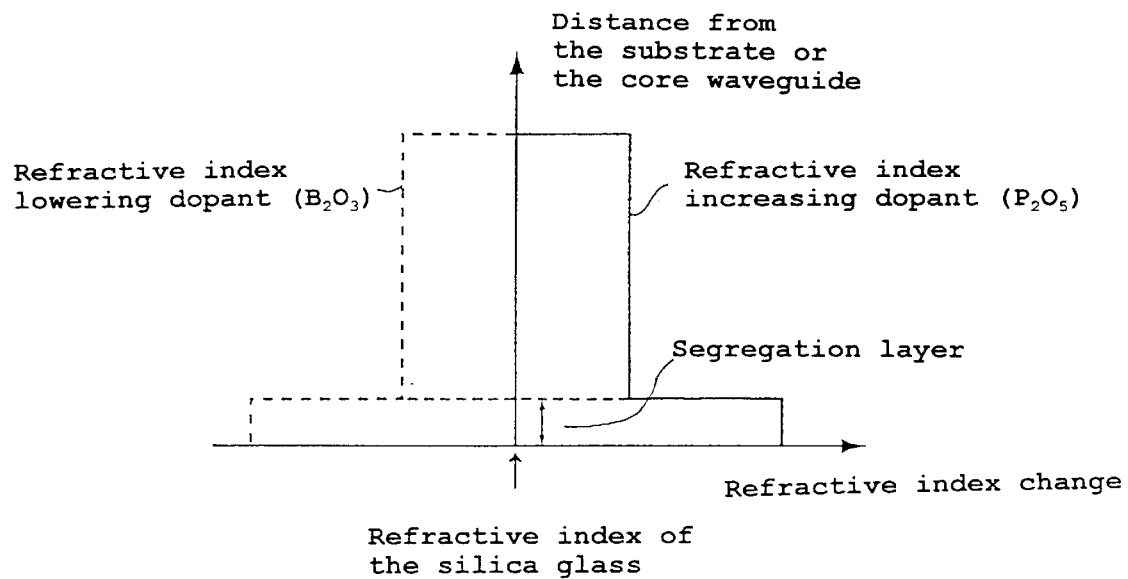

FIGS. 3A, 3B are graphs for explaining the dopant concentration distribution and the refractive index change by the dopant in the over cladding part in that case. The vertical axis represents the distance from the substrate or the core waveguide in the over cladding part, and the lateral axis represents the dopant concentration in FIG. 3A, and the refractive index change in FIG. 3B. The $P_2O_5$ segregation layer is formed in the part of the over cladding part close to the substrate or the core waveguide, with a relatively high $P_2O_5$ and $B_2O_3$ concentration in the segregation layer with respect to the other part.

Accordingly, as shown in FIG. 3B, the refractive index is changed drastically to the +side in the segregation layer, and it is changed slightly to the +side in the other part by $P_2O_5$. The refractive index is changed drastically to the −side in the segregation layer, and it is changed slightly to the −side in the other part by $B_2O_3$. The concentration of each dopant is adjusted such that the total refractive index change brought about by $P_2O_5$, and $B_2O_3$ can be substantially zero in the segregation layer part and the other part.

Moreover, although it is possible to offset the refractive index change in the segregation layer by $P_2O_5$ by addition of fluorine or by increase of the $B_2O_3$ amount alone, it is also possible to both execute the fluorine addition and the $B_2O_3$ amount increase for offsetting the refractive index change in the segregation layer by $P_2O_5$ by both fluorine and $B_2O_3$ so as to have the refractive index of the segregation layer substantially same as that of the other part in the over cladding part. Furthermore, since the fluorine addition causes decline of the thermal expansion coefficient so that the difference in the thermal expansion coefficient between the over cladding part and the substrate can be reduced, an effect of reducing the polarization dependency derived from generation of the thermal distortion can further be achieved.

Figure 4:
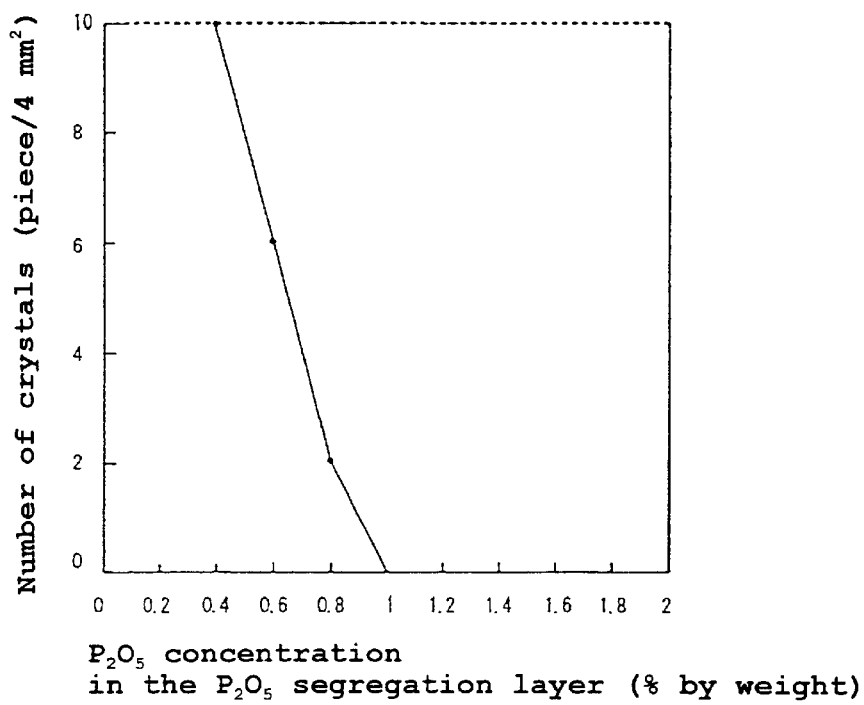
FIG. 4 is a graph showing the relationship between the $P_2O_5$ concentration in the segregation layer and the number of generated crystals.
Figure 5:
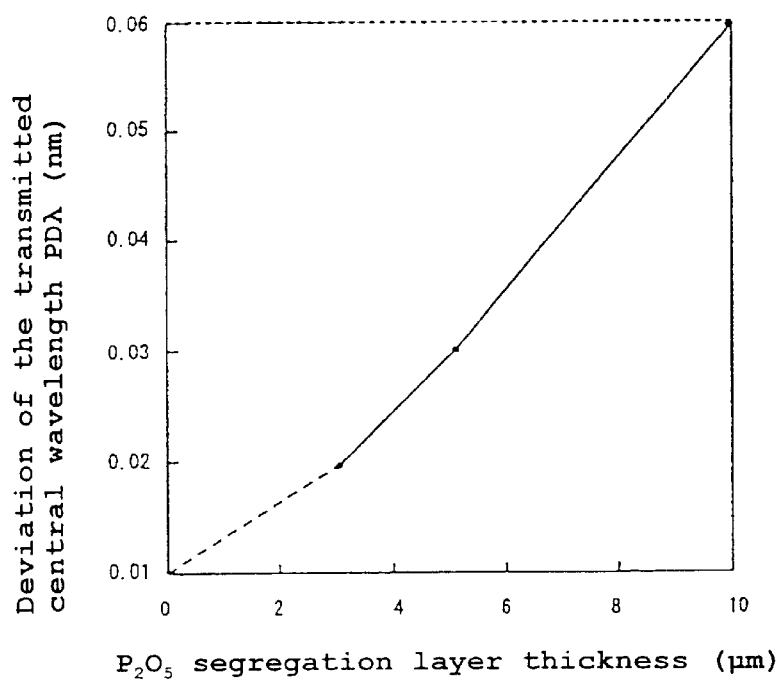
FIG. 5 is a graph showing the relationship between the $P_2O_5$ segregation layer thickness and the deviation of the transmitted central wavelength in the TE polarization and TM polarization (PD$\lambda$).

Moreover, it was learned that the $P_2O_5$ concentration in the $P_2O_5$ segregation layer influences the crystal growth at the interface between the over cladding part and the substrate or the core waveguide. FIG. 4 is a graph showing the relationship between the $P_2O_5$ concentration in the segregation layer and the number of generated crystals. According to the graph, the number of the generated crystal can be zero with a 1% by weight or more $P_2O_5$ concentration in the $P_2O_5$ segregation layer. The thickness of the $P_2O_5$ segregation layer for restraining the crystal generation can be any size, however, 1.5 $\mu$m or more is preferable for the production convenience. Furthermore, FIG. 5 is a graph showing the relationship between the $P_2O_5$ segregation layer thickness and the deviation of the transmitted central wavelength in the TE polarization and TM polarization (PD$\lambda$). According to the graph, the smaller the segregation layer thickness is, the smaller the PD$\lambda$ becomes so that the polarization dependency is improved. Moreover, with a 5 $\mu$m or less segregation layer thickness, the PD$\lambda$ is 0.03 nm or less, and thus a trouble is not caused in the practical use.

It is preferable that the part of the substrate 1 in contact with the core waveguide 2 be projected at least by the segregation layer 3a thickness with respect to the other part of the substrate 1. According to the configuration, since the part in the vicinity of the core waveguide, having a larger $P_2O_5$ concentration can further be reduced, the polarization dependency by the anisotropic thermal distortion can further be restrained in the core waveguide based on the thermal expansion coefficient difference in the substrate and the over cladding part surrounding the core waveguide.

The present invention will be specifically described below with referring to examples, but it should not be construed as the present invention is limited thereto.

EXAMPLE 1

As the "Example 1", the following silica based optical waveguide was produced. A core glass film made of $SiO_2$ with $GeO_2$ doped was formed on a substrate made of a silica glass with a 0.5 mm thickness and a 10 cm diameter by a plasma CVD method. The core glass film thickness was 6 $\mu$m, and the specific relative index difference with respect to the silica glass substrate was 0.75%. A core waveguide comprising an arrayed waveguide type multiplexer and demultiplexer (Arrayed Waveguide Grating: AWG) circuit was produced from the core glass film by a photolithography and a reactive ion etching.

Next, the substrate with the core waveguide formed was gripped by a holder made of silicon so as to be placed on a part of a turn table, made of silicon. While rotating and heating the turn table at 600° C. by a heater disposed below the turn table, a porous silica based glass layer made of $SiO_2$ with $P_2O_5$ and $B_2O_3$ doped was formed on the substrate by FHD method. The substrate with the porous silica based glass layer formed was placed in a sintering furnace so as to be heated at 1,000° C. for one hour under an atmosphere of an $SiF_4$/helium gas mixture being introduced. Thereafter, the $SiF_4$ supply was stopped so that it was heated at 1,300° C. for one hour under a helium gas atmosphere being introduced for transparent vitrification of the porous silica based glass layer.

Accordingly, a silica based optical waveguide having AWG circuit with a 30 μm thickness over cladding part formed on the substrate, covering the core waveguide was obtained. Crystal growth at the interface between the over cladding part and the core waveguide in the silica based optical waveguide was examined. Crystal growth was not found. Moreover, a part of the silica based optical waveguide was cut to measure the concentration of each dopant in the over cladding part. As a result, a segregation layer with a higher $P_2O_5$ concentration was produced in the part of the over cladding part in contact with the substrate and the core waveguide, with a 4 μm thickness, and a 1.8% by weight $P_2O_5$ concentration. Furthermore, a fluorine segregation layer was produced in the same part, with a 4 μm thickness, and a 0.5% by weight fluorine concentration. In the part other than the segregation layer, the $P_2O_5$ concentration was 1.2% by weight, and the fluorine concentration was 0.1% by weight or less. The $B_2O_3$ concentration was 1.5% by weight in the entire over cladding part, and it was not segregated.

Furthermore, the optical characteristics of the silica based optical waveguide having the AWG circuit were evaluated. Extremely good values, that is, the insertion loss of 3 dB to 4 dB, the cross talk of −28 dB to −35 dB, and the deviation of the transmitted central wavelength in the TE polarization and TM polarization (also referred to as the PDλ) of 0.015 nm for each channel were provided.

EXAMPLE 2

As the "Example 2", the following silica based optical waveguide was produced. With a silicon flat plate having a 1.0 mm thickness and a 10 cm diameter with an $SiO_2$ glass film whose thickness is 15 μm formed by a plasma CVD method used as a substrate, a core glass film made of $SiO_2$ with $GeO_2$ doped was formed on the substrate by a plasma CVD method. The core glass film thickness was 6 μm, and the specific relative index difference with respect to the silica glass substrate was 0.75%. A core waveguide comprising AWG circuit was produced from the core glass film by a photolithography and a reactive ion etching.

Next, the substrate with the core waveguide formed was gripped by a holder made of silicon so as to be placed on a part of a turn table, made of silicon. While rotating and heating the turn table at 500° C. by a heater disposed below the turn table, a porous silica based glass layer made of $SiO_2$ with $P_2O_5$ and $B_2O_3$ doped was formed on the substrate by FHD method. At the time, in order to have a higher $B_2O_3$ concentration in the vicinity of the core waveguide and the substrate, the B material introduced amount for the initial four times of the burner traverses was set to be eight times as much as the subsequent forty times of the burner traverses. The substrate with the porous silica based glass layer formed was placed in a sintering furnace so as to be heated at 1,100° C. for two hours under a helium gas atmosphere for transparent vitrification of the porous silica based glass layer so as to provide the over cladding part.

Accordingly, a silica based optical waveguide having AWG circuit with a 30 μm thickness over cladding part formed on the substrate, covering the core waveguide was obtained. Crystal growth at the interface between the over cladding part and the core waveguide in the silica based optical waveguide was examined. Crystal growth was not found. Moreover, a part of the silica based optical waveguide was cut to measure the concentration of each dopant in the over cladding part. As a result, a segregation layer with a higher $P_2O_5$ concentration was produced in the part of the over cladding part in contact with the substrate and the core waveguide, with about a 5 μm thickness, and a 10% by weight $P_2O_5$ concentration. Furthermore, a $B_2O_3$ concentration was also high at the side close to the core waveguide and the substrate. The $B_2O_3$ concentration in the part was 15% by weight, and the thickness of the part was about 5 μm. In the other part, the $P_2O_5$ concentration was 8% by weight, and the $B_2O_3$ concentration was 12% by weight.

Furthermore, the optical characteristics of the silica based optical waveguide having the AWG circuit were evaluated. Practically good values, that is, the insertion loss of 3 dB to 4 dB, the cross talk of −25 dB to −32 dB, and the deviation of the transmitted central wavelength in the TE polarization and TM polarization (also referred to as the PDX) of 0.03 nm were provided for each channel.

Comparative Example 1

As the "Comparative Example 1", the following silica based optical waveguide was produced. The process to the formation of the porous silica based glass layer on the substrate was same as the Example 1. The substrate with the porous silica based glass layer formed was placed in a sintering furnace so as to be heated at 1,300° C. for one hour under a helium gas atmosphere for transparent vitrification of the porous silica based glass layer. Thereby, a silica based optical waveguide having AWG circuit with a 30 μm thickness over cladding part formed on the substrate, covering the core waveguide was obtained. Crystal growth at the interface between the over cladding part and the core waveguide in the silica based optical waveguide was examined. Crystal growth was not found.

Moreover, a part of the silica based optical waveguide was cut to measure the concentration of each dopant in the over cladding part. As a result, a segregation layer with a higher $P_2O_5$ concentration was produced in the part of the over cladding part in contact with the substrate and the core waveguide, with a 4 μm thickness, and a 1.8% by weight $P_2O_5$ concentration. Furthermore, in the part other than the segregation layer, the $P_2O_5$ concentration was 1.2% by weight. The $B_2O_3$ concentration was 1.5% by weight in the entire over cladding part, and it was not segregated.

Furthermore, the optical characteristics of the silica based optical waveguide having the AWG circuit were evaluated. The insertion loss was 3 dB to 4 dB, the cross talk was −20 dB to −27 dB, and the deviation of the transmitted central wavelength in the TE polarization and TM polarization (also referred to as the PDλ) was 0.04 nm, and thus the cross talk and the deviation of the transmitted central wavelength were large compared with the Examples 1 and 2 for each channel.

Comparative Example 2

As the "Comparative Example 2", the following silica based optical waveguide was produced. The process to the formation of the core waveguide on the substrate was same as the Example 1. Furthermore, the porous silica based glass layer was formed on the substrate in the same process as the Example 1 except that the turn table heating temperature was changed to 300° C. The substrate with the porous silica based glass layer formed was placed in a sintering furnace so as to be heated at 1,300° C. for one hour under a helium gas atmosphere for transparent vitrification of the porous silica based glass layer. Thereby, a silica based optical waveguide having AWG circuit with a 30 μm thickness over cladding part formed on the substrate, covering the core waveguide was obtained.

The interface between the over cladding part and the core waveguide in the silica based optical waveguide was examined. Crystals were found like dots. Moreover, a part of the silica based optical waveguide was cut to measure the concentration of each dopant in the over cladding part. As a result, the $P_2O_5$ concentration was 1.3% by weight in the entire over cladding part without segregation. The $B_2O_3$ concentration was 1.5% by weight in the entire over cladding part without segregation. Furthermore, the optical characteristics of the silica based optical waveguide having the AWG circuit were evaluated. The insertion loss was 5 dB to 8 dB, and the cross talk was −15 dB to −20 dB, and thus the optical characteristics were much poorer than the Examples 1 and 2 for each channel. Moreover, it is poorer than the Comparative Example 1.

Since a silica based optical waveguide according to the present invention comprises a substrate, a core waveguide formed on the substrate, and an over cladding part formed on the substrate so as to cover the core waveguide, wherein a segregation layer with a higher concentration of a refractive index increasing dopant is formed in a part of the over cladding part in contact with the substrate and the core waveguide such that at least a part of the refractive index increase in the segregation layer with respect to the part of the over cladding part other than the segregation layer is offset by decline of the refractive index by increasing the amount of a refractive index lowering dopant added in the segregation layer and/or adding another refractive index lowering dopant, the refractive index of the segregation layer in the over cladding part can be lowered to a level substantially same as that of the other part. Therefore, since a high refractive index by the segregation layer can be alleviated, interference among circuits can hardly be generated even in the case the interval between the core waveguides is narrow.

Moreover, owing to the existence of the $P_2O_5$ segregation layer, the polarization dependency by the anisotropic thermal distortion can be restrained in the core waveguide based on the thermal expansion coefficient difference in the substrate and the over cladding part surrounding the core waveguide. Furthermore, the crystal growth at the interface between the over cladding part and the core waveguide can be restrained so as to provide an optical waveguide with a small propagation loss. Moreover, by offsetting the refractive index increase in the $P_2O_5$ segregation layer by addition of fluorine, since the fluorine addition causes decline of the thermal expansion coefficient so that the difference in the thermal expansion coefficient between the over cladding part and the substrate can be reduced, the polarization dependency derived from generation of the thermal distortion can further be reduced.

While the invention has been described in detail and with reference to specific embodiments thereof, it will be apparent to one skilled in the art that various changes and modifications can be made therein without departing from the spirit and scope thereof.

What is claimed is:

1. A silica based optical waveguide comprising a substrate, a core waveguide formed thereon, and an over cladding part comprising a silica based glass with a refractive index lowering dopant and a refractive index increasing dopant added, formed on the substrate so as to cover the core waveguide, wherein a segregation layer with a higher concentration of the refractive index increasing dopant is formed in a part of the over cladding part in contact with the substrate and the core waveguide such that at least a part of the refractive index increase in the segregation layer provided by the refractive index increasing dopant with respect to the part of the over cladding part other than the segregation layer is offset by decline of the refractive index by increasing the amount of the refractive index lowering dopant added in the segregation layer and/or adding another refractive index lowering dopant.

2. The silica based optical waveguide according to claim 1, wherein the refractive index increasing dopant is $P_2O_5$, the refractive index lowering dopant is $B_2O_3$, and the other refractive index lowering dopant is fluorine.

3. The silica based optical waveguide according to claim 2, wherein the segregation layer has a 1% by weight or more and 15% by weight or less addition concentration of $P_2O_5$, and a 1.5 μm or more and 5 μm or less thickness.

4. The silica based optical waveguide according to claim 1, wherein the part of the substrate in contact with the core waveguide is projected at least by the segregation layer thickness with respect to the other part of the substrate.

5. A production method for a silica based waveguide comprising the steps of:

forming a porous silica based glass layer having a segregation layer with $P_2O_5$ segregated with a higher concentration in a part in contact with the substrate and the core waveguide by accumulating glass fine particles comprising a silica glass with a refractive index lowering dopant and $P_2O_5$ added by Flame Hydrolysis Deposition method on the substrate so as to cover the core waveguide while keeping a substrate having a core waveguide with a rectangular or square lateral cross-section formed thereon at a 500° C. to 700° C. temperature, thereafter heating the porous silica based glass layer in a fluorine gas atmosphere so as to offset at least a part of the refractive index increase in the segregation layer derived from the segregation of $P_2O_5$ by the refractive index decline by segregation of fluorine, and sintering the porous silica based glass layer so as to provide a transparent vitrified over cladding part.

6. A production method for a silica based waveguide comprising the steps of:

forming a porous silica based glass layer having a segregation layer with $P_2O_5$ segregated with a higher concentration in a part in contact with the substrate and the core waveguide by accumulating glass fine particles comprising a silica glass with a refractive index lowering dopant and $P_2O_5$ added by Flame Hydrolysis Deposition method on the substrate so as to cover the core waveguide while keeping a substrate having a core waveguide with a rectangular or square lateral cross-section formed thereon at a 500° C. to 700° C. tem perature as well as at the same time increasing the amount of the refractive index lowering dopant in the segregation layer than the other part by adjusting a supply amount of material gas for the refractive index lowering dopant, thereafter sintering the porous silica based glass layer for transparent vitrification so as to provide an over cladding part with at least a part of the refractive index increase in the segregation layer derived from the segregation of $P_2O_5$ offset by the refractive index decline by the increase of the amount of the refractive index lowering dopant.

7. The production method for a silica based waveguide according to claim 5, wherein the refractive index lowering dopant is $B_2O_3$.

8. The production method for a silica based waveguide according to claim 5, wherein the operation of keeping the substrate having the core waveguide formed thereon at a 500° C. to 700° C. temperature comprises the steps of holding the substrate by a holder comprising silicon, and placing the holder on a part of a rotating turn table comprising silicon so as to be heated by a heater disposed below the turn table.

* * * * *